United States Patent [19]

Anderson

[11] Patent Number: 5,716,176
[45] Date of Patent: Feb. 10, 1998

[54] CARGO NET WITH ENHANCED ELASTICITY

[75] Inventor: Ronald A. Anderson, Seattle, Wash.

[73] Assignee: Pacific Rim Supplies, Ltd., Seattle, Wash.

[21] Appl. No.: 559,542

[22] Filed: Nov. 16, 1995

[51] Int. Cl.$^6$ ............................................. B60P 7/04
[52] U.S. Cl. ......................... 410/118; 296/100; 410/97
[58] Field of Search ........................... 296/100, 101, 296/85; 410/96, 97, 154, 156; 160/DIG. 2, 327, 328, 329

[56] References Cited

U.S. PATENT DOCUMENTS

| 181,047 | 8/1876 | Cremer | 296/100 |
|---|---|---|---|
| 2,950,691 | 8/1960 | Huber | 410/118 |
| 3,481,371 | 12/1969 | Row | 296/100 |
| 5,090,856 | 2/1992 | Moore | 410/118 |
| 5,137,324 | 8/1992 | Hershberger | 410/97 |
| 5,318,337 | 6/1994 | Gote et al. | 296/85 |
| 5,328,310 | 7/1994 | Lockney | 410/96 |
| 5,437,474 | 8/1995 | Ament | 410/118 |

*Primary Examiner*—Karen B. Merritt
*Assistant Examiner*—Gregory A. Morse
*Attorney, Agent, or Firm*—Ronald M. Anderson

[57] ABSTRACT

A cargo net for retaining a load in a container. A cargo net (12) comprises a plurality of hexagonal-shaped cells (44) formed by knitting or weaving strands (40) together along opposite adjacent sides (42) of adjoining cells. Since the strands are joined by knitting or weaving along the common sides of each cell, use of knots to form the mesh of the net by tying strands is avoided. The hexagonal shape of the net, and the nautilus construction used in forming the net contribute to its characteristic elasticity, which enables the cargo net to conform to irregular shapes and sizes of objects comprising the load. The cargo net is thus ideal for containing and securing a load in a bed (26) of a pickup truck (10). A binding strip (28) surrounds the perimeter of the cargo net, distributing any stress applied when securing the net around the perimeter of the bed or other container with which it is used.

10 Claims, 2 Drawing Sheets

CARGO NET WITH ENHANCED ELASTICITY

FIELD OF THE INVENTION

The present invention generally relates to a net for covering cargo, and more specifically, to a net that is fabricated for use in holding objects inside a container, such as the bed of a pickup truck, during transport of the objects in the container.

BACKGROUND OF THE INVENTION

Pickup trucks are among the most popular types of vehicles in the U.S. In part, this popularity is due to the ease with which bulky loads can be loaded, transported, and unloaded from the bed of the pickup. It is generally impractical or impossible to haul yard waste such as leaves and trimmings or large boxes or furniture in ordinary automobiles or sports utility vehicles. In contrast, pickup trucks are ideally suited for this function. However, unless the bed is covered by a hard shell or canopy, which tends to interfere with loading, waste materials or other goods being hauled are subject to being blown out of the bed when the truck is moving. Accordingly, many states have passed laws that require such loads be covered to prevent littering of the roadways with materials that have blown out of the open bed.

The most common approach used to cover cargo carried in the bed of a pickup truck is to tie a canvas tarpaulin over the load. Many pickup trucks include hooks spaced along the outsides (or insides) of the bed to which a rope can be tied to hold the canvas (and the load) in place. Unless the rope is attached to eyes spaced along the canvas perimeter and stretched tight, rather than simply run over the top of the tarp, it is very likely that the wind caused by the truck's motion will lift the canvas, pulling it away from the load and allowing debris to escape the pickup truck bed. The driver of the truck may then be cited for littering. Moreover, as the force of the wind against the canvas stretches the rope used to secure the tarp, objects or material covered by the canvas may shift about, fall from the truck, or be damaged by abrasion against other portions of the load.

Canvas, which has a relatively rough surface, can abrade the finish on furniture and other objects comprising the cargo due the relative movement of components of the load, particularly as the canvas loosens while the truck is traveling. Sharp corners on boxes carried in the truck can wear a hole through the canvas, cause it to tear, and ultimately lead to its disintegration. Thus, a canvas tarpaulin is clearly not an ideal cover to secure a cargo carried in the bed of a pickup truck.

In contrast, a net used to secure a load avoids many of the problems experienced by a canvas tarpaulin. Air readily flows through the mesh of a net, avoiding the ballooning effect that occurs with a canvas cover due to movement through air. Furthermore, the mesh of a net more effectively secures boxes and objects comprising a load, without the abrasion problem noted above.

U.S. Pat. No. 5,040,934 recognizes the advantages of using a net as a cargo cover. The Cargo Retaining Device disclosed in this patent includes a net formed of crisscrossed strands of an inelastic material, which are knotted at each intersection. A cord or rope extends around the perimeter of the net, and the net has approximately the same shape and size as the bed of the truck with which the net will be used. Hooks mounted in stake openings around the bed are used to secure the cord to attach the net to the vehicle so that it covers a load in the bed. However, the patent specifically teaches and emphasizes that the net disclosed therein for use as a cargo retaining device should be constructed of an inelastic material and suggests that it is disadvantageous to use netting that has substantial elasticity.

Objects carried in a pickup truck bed are often very different in shape and size. For example, pieces of furniture and boxes loaded into a pickup may be of different shape and height. Such a load will have an uneven surface. Even piles of yard waste and trimmings loaded into the bed of a pickup can be irregular in conformation. An inelastic net is incapable of conforming to the uneven surface of an irregular load to fully cover the load and prevent the load from shifting as the truck is in motion. Accordingly, the invention disclosed in U.S. Pat. No. 5,040,934 fails to solve a significant problem. If the inelastic cargo retaining device disclosed in the patent is used to cover objects of varying size and shape, the smaller pieces will likely not be restrained from moving about and may become damaged. If the inelastic net is used to cover piles of yard waste having an irregular surface, such as tree trimmings, the load will not be properly compacted when tied down, and branches or leaves may work free of the net and be blown from the bed of the truck. Instead of being inelastic, as taught by the prior art, a net used for covering a cargo should thus be substantially elastic to enable the net to conform to irregularly sized and shaped loads.

The cargo retaining device disclosed in the prior art has a further problem, because it uses knots to form the mesh of the net. Strands of a plastic material are tied together to produce knots that define a square-shaped mesh that comprises the net. The knots are relatively hard and give the net an abrasive feel. It would clearly be preferable to employ a net that does not use knots to join the strands comprising the net. Such a net should be much softer and less likely to abrade and damage the finish of fine furniture and the surface of other objects that are in contact with the net. The prior art does not disclose a cargo cover that has all of these desired properties.

SUMMARY OF THE INVENTION

In accord with the present invention, a cargo cover is defined for a load carried in a container having an open top. The cargo cover comprises a net formed of strands that are knitted together in a mesh having a plurality of connected hexagonal-shaped loops; the net is sized to cover the open top of the container. A strip of woven material is folded to overlap the edges of the net and is secured about the edges to form a binding that extends around a perimeter of the net. Due to its configuration and construction, the net has a characteristic substantial elasticity that enables the net to conform about an irregularly-shaped load when the net is stretched over the irregularly-shaped load.

Preferably, the mesh comprises a plurality of knitted joints that connect adjacent hexagonal-shaped loops. The knitted joints are disposed at opposite sides of the hexagonal-shaped loops. Knitted joints that connect adjacent hexagonal-shaped loops are knitted together along substantially the entire length of the joined sides of the adjacent hexagonal-shaped loops.

The cargo cover further comprises stitches that bind the strip of woven material along the edge of the net. These stitches extend through the hexagonal-shaped loops along the edge of the net. The strip of material is folded to contact opposite surfaces of the net, along its edge, so that the stitches connect the strip to the net.

The binding adapts the net to couple to hooks spaced apart around and adjacent to the open top of the container. Preferably, the strands of the net comprise a plastic material. Since the net is knotless, it is less likely to abrade a surface of any object covered by the net than a net constructed by tying knots in the strands.

BRIEF DESCRIPTION OF THE DRAWING FIGURES

The foregoing aspects and many of the attendant advantages of this invention will become more readily appreciated as the same becomes better understood by reference to the following detailed description, when taken in conjunction with the accompanying drawings, wherein.

DESCRIPTION OF THE PREFERRED EMBODIMENT

Figure 1:
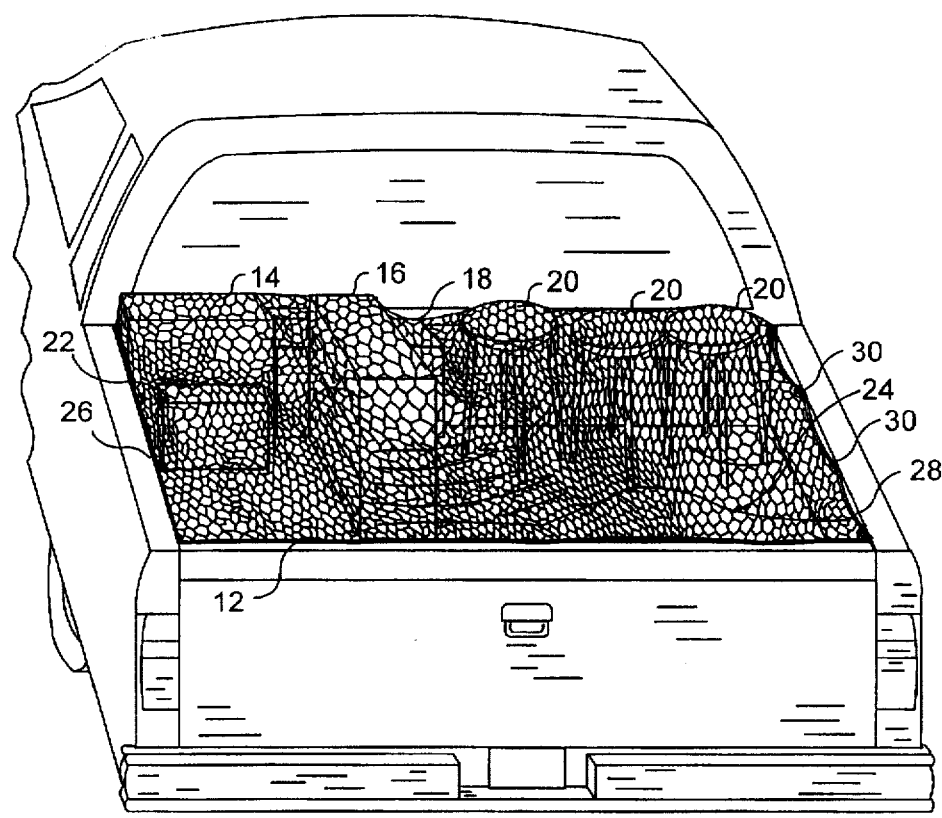
FIG. 1 is an isometric view of a portion of a pickup truck, showing the net constructed in accordance with the present invention in use in covering and securing a load in the bed of the pickup truck.

Although the present invention can be used for covering cargo and other types of open containers, a preferred embodiment of the present invention is intended for covering cargo carried by a pickup truck 10, as shown in FIG. 1. In the example shown in FIG. 1, a cargo net 12 made in accordance with the present invention is used to secure a load that is being carried in a bed 26 of the pickup truck. It is also contemplated that cargo net 10 could be used for covering an open top box or other suitable container in much the same fashion as it is used to cover the objects in the bed of the pickup truck shown in FIG. 1. To better illustrate some Of the features and advantages of cargo net 12, the load shown in bed 26 in the illustration includes a plurality of different sized and shaped objects, including a tall box 14, a chest of drawers 16, a medium-height box 18, three bar stools 20, and a short box 22. Since these objects are of various size, shape, and height, cargo net 12 must elastically distort to cover and secure all of the objects.

It will be apparent that if these various objects were covered using a conventional canvas tarpaulin (not shown), the canvas would be stretched across and contact the taller objects, but would not contact the shorter objects, and thus, would not provide any support to secure the shorter objects. Further, as noted above, the open configuration of cargo net 12 does not catch air moving over the pickup truck while the truck is in motion, and therefore cargo net 12 is not subject to "ballooning." The ballooning effect tends to stretch canvas, causing it to loosen over a load in the bed of a pickup truck.

Unlike the prior art cargo covers discussed above, cargo net 12 elastically stretches to engage the corners of each of the taller objects, such as chest of drawers 16, and tall box 14, while sagging to engage the corners of the shorter objects, such as boxes 18 and 22. Furthermore, the characteristic elastic distortion of cargo net 12 enables it to conform around the round tops of bar stools 20, thereby providing support for them and preventing their shifting while pickup truck 10 is in motion. Accordingly, it should be apparent that cargo net 12 provides a substantial advantage when compared to a prior art canvas tarpaulin or inelastic net, since the prior art cargo covers are generally incapable of distorting elastically to conform to the shape of the load carried in the bed of the pickup track.

A binding strip 28 extends around the periphery of cargo net 12 and is attached to the edge of the net so as to distribute any stress applied when attaching the net to the pickup track, to secure the load. In the illustrative example shown in FIG. 1, a plurality of metal hooks 30 are spaced along and adjacent to the interior top edge of bed 26. The binding strip on cargo net 12 is engaged on hooks 30, thereby securing the cargo net over the upper surface of the objects comprising the load carried by the pickup track. Although the hooks are shown only along the right (passenger) side of bed 26, it will be understood that the hooks are also provided along the left (driver) side of the bed. It is also contemplated that alternatively, a rope can be threaded through the mesh of cargo net 12 adjacent to binding strip 28 and secured to stakes or other tie-down appurtenances on pickup truck 10 to secure the net in place over the load. Binding strip 28 distributes the stress applied to the cargo net when it is secured over a load and prevents tearing of the cargo net when a substantial force is applied to stretch the net over a load.

Figure 3:
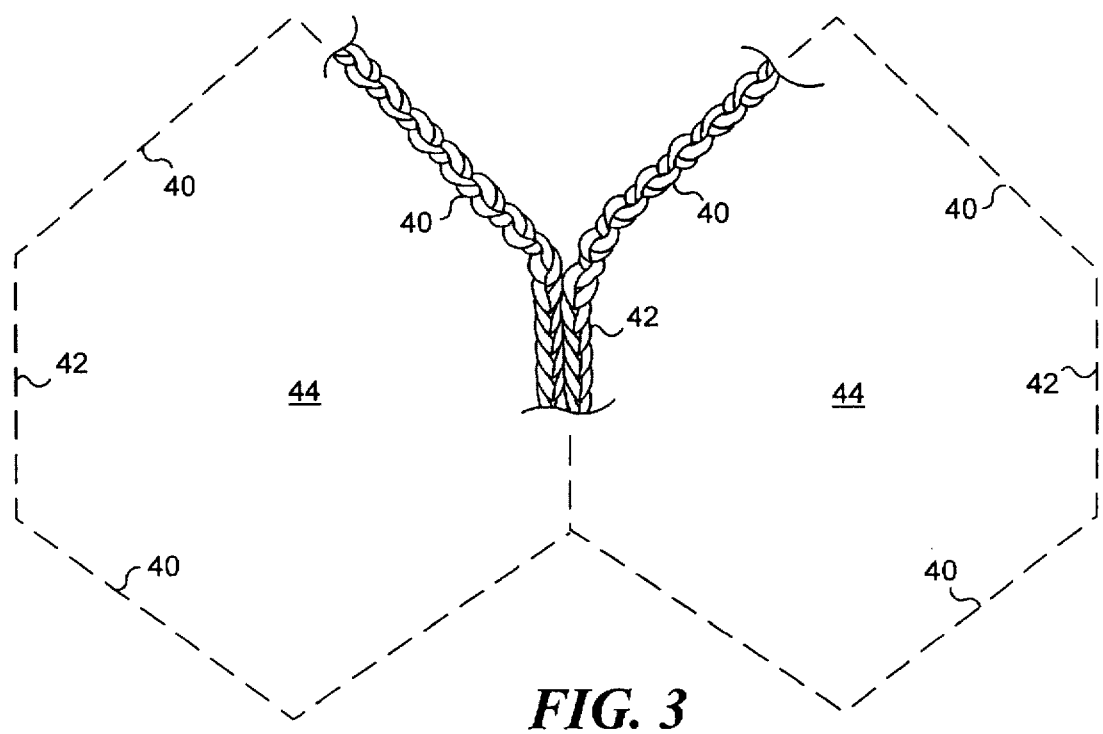
FIG. 3 illustrates a portion of mesh comprising the net, showing how the strands of opposite sides of two adjacent cells of the net are knitted together to connect the cells.
Figure 2:
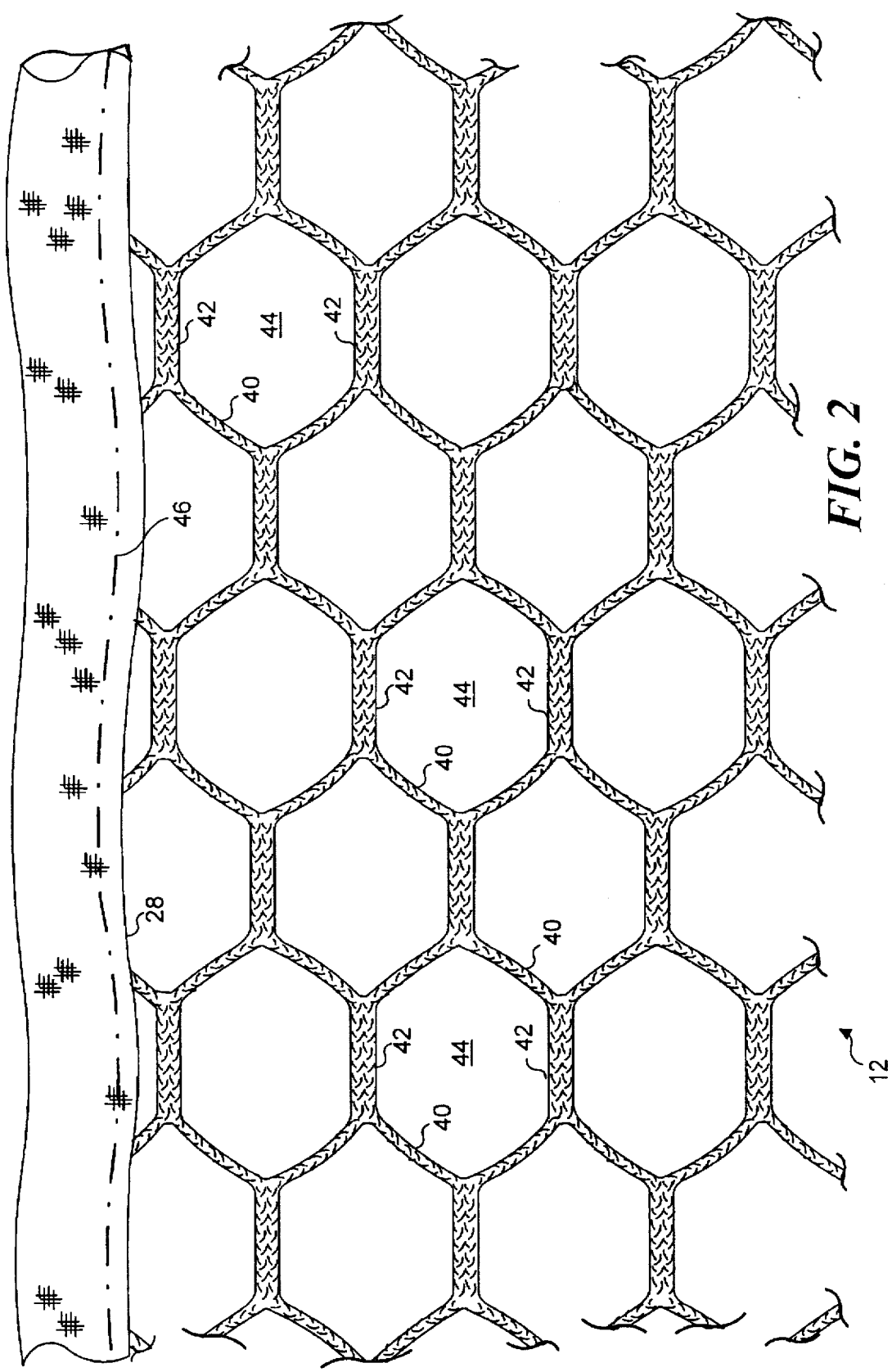
FIG. 2 is a plan view of a small portion of the net, adjacent one edge.

Cargo net 12 comprises a mesh of hexagonal-shaped cells 44, as shown in FIGS. 2 and 3. Unlike conventional nets that are fabricated by tying twisted strands together to form a square or diamond shaped mesh, cargo net 12 is made by knitting or weaving multifiber plastic strands 40 together, so that two adjacent cells 44 are joined fully along a common side, as shown in FIGS. 2 and 3. A single knitted strand 40 comprises four of the six sides of each cell 44, while the knitted strands of two adjacent cells 44 are knitted or woven together to form a double thick strand 42 on two sides of each cell 44.

Although the term "knotless" is used in connection with cargo net 12 to describe a characteristic of the invention, it could be argued that the knitted or woven strands in fact are formed by creating a series of connected knots. However, for purposes of this disclosure and the claims that follow below, the term "knotless" is intended to indicate that the mesh comprising cargo net 12 does not comprise a single knot formed by tying two strands together to form the mesh, as in a conventional net. As a result, cargo net 12 has a substantially softer feel and is less likely to abraid the surface of objects comprising a cargo. The knot used to join strands in a conventional net, which is formed by tying the strands together rather than knitting or weaving the strands as in the present invention, is sufficiently abrasive to scratch the surface or finish on furniture, such as chest of drawers 16 (shown in FIG. 1). In contrast, cargo net 12 is relatively soft to the touch and does not include any hard and abrasive knots.

In the preferred form of the invention, the multifiber strands comprising cargo net 12 comprise a NYLON™ fiber. However, it is also contemplated that other types of plastic materials such as rayon and polyester can be used to produce the cargo net. Binding strip 28 preferably comprises a woven NYLON™ fabric material that is folded over the edge of the mesh comprising cargo net 12 so that the inner surface of the binding strip contacts the opposite surfaces of the cargo net mesh along its edge, and is held together with stitches 46 that extend through the strip of material and the mesh, binding the strip of material around the raw edge of the mesh. Stitches 46 thus fasten the facing surfaces of the strip of material together and attach the material comprising binding strip 28 to the mesh.

FIG. 3 shows further details of the construction of two adjacent cells 44. Since strands forming two sides 40 are knitted or woven together to form thick strand 42 that is a common side of the two adjacent cells, cargo net 12 is relatively strong. The same type of mesh is used in gill nets and is thus readily available from commercial fishing goods distributors. The hexagonal shape of cells 44 provides greater elasticity than is available in a conventional square or diamond-shaped knotted net. Further, the use of strands that are knitted or woven further increases the characteristic elasticity of cargo net 12 compared to conventional nets that are made using twisted and/or braided fibers.

Although the present invention has been described in connection with the preferred form of practicing it, those of ordinary skill in the art will understand that many modifications can be made thereto within the scope of the claims that follow. Accordingly, it is not intended that the scope of the invention in any way be limited by the above description, but instead be determined entirely by reference to the claims that follow.

The invention in which an exclusive right is claimed is defined by the following:

1. A cargo cover for a load carried in a container having an open top, comprising:
   (a) a net formed of strands that are knitted together in a mesh comprising a plurality of connected hexagonal-shaped loops, said net being sized to substantially cover the open top of the container; and
   (b) a strip of woven material that is folded to overlap each edge of the net and is bound about the edges to form a binding, said binding extending around a perimeter of the net, said strands forming the net having a substantial characteristic elasticity that enables the net to closely conform to an irregularly-shaped load when the net is stretched over the load, so that said load is secured in place within the container.

2. The cargo cover of claim 1, wherein the mesh comprises a plurality of knitted joints that connect adjacent hexagonal-shaped loops, said knitted joints being disposed at two opposite sides of the hexagonal-shaped loops.

3. The cargo cover of claim 2, wherein the knitted joints that connect adjacent hexagonal-shaped loops are knitted together along substantially the entire length of joined sides of the adjacent hexagonal-shaped loops.

4. The cargo cover of claim 1, further comprising stitches that extend through the hexagonal-shaped loops along the edge of the net, said strip of material being in contact with opposite surfaces of the net and disposed along the edge of the net, so that the stitches connect the strip to the net.

5. The cargo cover of claim 1, wherein the binding distributes stress applied to stretch the net over the load.

6. The cargo cover of claim 1, wherein the strands comprise a plastic material having a substantial characteristic elasticity.

7. A cargo cover adapted to cover loads carried in a truck, comprising:
   (a) a knotless net comprising strands that are knitted together to form a hexagonal mesh, said mesh comprising adjoining cells, wherein a cell that is not along an edge of the knotless net shares sides with four adjacent cells and is joined with two other cells along opposite edges; and
   (b) means for binding the edges of the knotless net, to protect the edges and distribute any stress applied to the knotless net along said edges, said strands forming the knotless net having a substantial elasticity that enables the mesh to closely conform to an irregularly-shaped load so that said load is secured in place within the truck.

8. The cargo cover of claim 7, wherein the means for binding comprise a strip of material folded around the edge of the net; and stitching extending through cells disposed along the edge of the net to fasten the strip of material to the edge of the net.

9. The cargo cover of claim 7, wherein the hexagonal mesh comprises a plastic thread woven into the strands that form said cells, said thread comprising the strands for the adjacent cells being woven together along said opposite sides of the cells.

10. The cargo cover of claim 7, wherein the means for binding comprise a strip of plastic material secured about the edge of the knotless net.

* * * * *